(12) United States Patent
Lu et al.

(10) Patent No.: US 9,712,426 B2
(45) Date of Patent: Jul. 18, 2017

(54) MULTI-DOMAIN ROUTING COMPUTATION METHOD AND DEVICE, PATH COMPUTATION ELEMENT AND ROUTING NETWORK

(71) Applicant: ZTE Corporation, Shenzhen, Guangdong (CN)

(72) Inventors: Gang Lu, Shenzhen (CN); Dajiang Wang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 81 days.

(21) Appl. No.: 14/648,835

(22) PCT Filed: Jul. 18, 2013

(86) PCT No.: PCT/CN2013/079628
§ 371 (c)(1),
(2) Date: Jun. 1, 2015

(87) PCT Pub. No.: WO2013/167051
PCT Pub. Date: Nov. 14, 2013

(65) Prior Publication Data
US 2015/0341255 A1    Nov. 26, 2015

(30) Foreign Application Priority Data

Nov. 30, 2012   (CN) .......................... 2012 1 0505161

(51) Int. Cl.
*H04L 12/715*    (2013.01)
*H04L 12/721*    (2013.01)
(Continued)

(52) U.S. Cl.
CPC .......... *H04L 45/16* (2013.01); *H04L 12/4625* (2013.01); *H04L 45/02* (2013.01);
(Continued)

(58) Field of Classification Search
None
See application file for complete search history.

(56) References Cited

U.S. PATENT DOCUMENTS

| 9,331,956 B2 * | 5/2016 | Wang | H04L 47/724 |
| 2006/0039391 A1 * | 2/2006 | Vasseur | H04L 45/04 |
| | | | 370/409 |

(Continued)

FOREIGN PATENT DOCUMENTS

| CN | 101083548 A | 12/2007 |
| CN | 101296178 A | 10/2008 |

(Continued)

OTHER PUBLICATIONS

International Search Report in international application No. PCT/CN2013/079628, mailed on Oct. 24, 2013.

(Continued)

*Primary Examiner* — Hassan Phillips
*Assistant Examiner* — Duc Duong
(74) *Attorney, Agent, or Firm* — Oppedahl Patent Law Firm LLC

(57) ABSTRACT

Disclosed is a multi-domain routing computation method, including: when it is determined that there are two or more domains deployed with a Path Computation Elements (PCE) in a network, a routing path is computed, between a PCE of a first domain and a PCE of a last domain among the two or more domains deployed with a PCE, using an extended Backward-Recursive PCE-Based Computation (BRPC) algorithm, and the routing path is computed using a Routing Controller (RC) in domains other than the two or more domains deployed with a PCE. Further disclosed are a multi-domain routing computation device, a path computation element and a routing network. The present disclosure (Continued)

can improve greatly optimality of path computation and has a fairly high efficiency for the path computation.

18 Claims, 6 Drawing Sheets

(51) Int. Cl.
    *H04L 12/761*     (2013.01)
    *H04L 12/751*     (2013.01)
    *H04L 12/46*     (2006.01)
    *H04L 12/717*     (2013.01)
    *H04L 12/753*     (2013.01)

(52) U.S. Cl.
    CPC .............. *H04L 45/04* (2013.01); *H04L 45/12* (2013.01); *H04L 45/42* (2013.01); *H04L 45/48* (2013.01)

(56) References Cited

U.S. PATENT DOCUMENTS

| | | | |
|---|---|---|---|
| 2006/0101142 A1 | 5/2006 | Vasseur | |
| 2008/0002664 A1 | 1/2008 | Li | |
| 2010/0039939 A1* | 2/2010 | Wang | H04L 45/42 370/238 |
| 2010/0208733 A1* | 8/2010 | Zhao | H04L 12/185 370/390 |
| 2011/0044352 A1* | 2/2011 | Chaitou | H04L 45/04 370/408 |
| 2011/0242995 A1* | 10/2011 | Zhang | H04L 45/00 370/252 |
| 2011/0243030 A1* | 10/2011 | Zhang | H04L 45/04 370/254 |
| 2012/0069740 A1* | 3/2012 | Lu | H04L 45/04 370/238 |
| 2012/0102228 A1* | 4/2012 | Cugini | H04L 45/04 709/242 |
| 2012/0195229 A1* | 8/2012 | Chen | H04L 45/12 370/254 |
| 2012/0281592 A1* | 11/2012 | Zhao | H04L 41/12 370/254 |
| 2012/0308225 A1* | 12/2012 | Long | H04L 45/04 398/13 |
| 2013/0034103 A1* | 2/2013 | Chen | H04L 45/124 370/400 |
| 2013/0070752 A1* | 3/2013 | Dhruv | H04L 45/44 370/351 |
| 2013/0100817 A1* | 4/2013 | Oltman | H04L 45/125 370/238 |
| 2014/0149595 A1* | 5/2014 | Dhody | H04L 45/00 709/230 |

FOREIGN PATENT DOCUMENTS

| | | |
|---|---|---|
| CN | 101432720 A | 5/2009 |
| CN | 103023774 A | 4/2013 |
| WO | 2011044925 A1 | 4/2011 |

OTHER PUBLICATIONS

English Translation of the Written Opinion of the International Search Authority in international application No. PCT/CN2013/079628, mailed on Oct. 24, 2013.
External Network-Network Interface (E-NNI) OSPFv2-based Routing—2.0 (Intra-Carrier) Implementation Agreement, Jul. 13, 2011.
Network Working Group, Apr. 2009.
Networking Working Group, Feb. 2008.
Supplementary European Search Report in European application No. 13787267.7, mailed on Nov. 11, 2015.
Path-Computation-Element-Based Architecture for Interdomain MPLS/GMPLS Traffic Engineering:Overview and Performance, mailed on Jul. 1, 2007.

* cited by examiner

2) When computing a VSPT of the domain, PCE(i-1) computes a combined topology of the extended topology of an inter-domain link between AS(i-1) and AS(i+1) and practical intra-domain topology of the domain 1) Topology of AS(i) is abstracted as extended topology of an inter-domain link between AS(i-1) and AS(i+1)

MULTI-DOMAIN ROUTING COMPUTATION METHOD AND DEVICE, PATH COMPUTATION ELEMENT AND ROUTING NETWORK

TECHNICAL FIELD

The present disclosure relates to routing computation techniques, and in particular to a multi-domain routing computation method and device, a Path Computation Element (PCE) and a routing network.

BACKGROUND

In multi-layer and multi-domain networks using Generalized Multi-Protocol Label Switching (GMPLS), multiple types of nodes having different switching capabilities and rates can be divided into different domains or layers, and these domains may be router domains, Optical Transport Network (OTN) domains or Packet Transport Network (PTN) domains and the like. In a multi-domain network divided by an Autonomous System (AS), an end-to-end path transversing multiple domains can be computed using a Routing Controller (RC) or a Path Computation Element.

The Optical Internetworking Forum (OIF) is a standard organization specialized in studying optical internetworking. In order to implement intercommunication between multi-domain networks, a standard of "E-NNI OSPFv2-based Routing −2.0 Implementation Agreement" has been formulated and a multi-domain intercommunication path computation method using an RC and based on the Domain to Domain Routing Protocol (DDRP) has been proposed. In such a method, intra-domain topology of each domain is abstracted and represented as abstract links, inter-domain topology information of multiple domain is flooded through the DDRP, which includes information regarding inter-domain links, intra-domain abstract links, and boundary nodes of each domain, as shown in FIG. 1. Based on the inter-domain topology, computation of inter-domain routing is performed by an RC of a first domain, then based on computed inter-domain paths (including inter-domain links, domain boundary nodes and intra-domain abstract links), specific intra-domain routing in each domain is computed at entering boundary nodes of each domain, and signaling is routed according to the computed path, as shown in FIG. 2.

The Internet Engineering Task Force (IETF) has proposed multi-domain path computation using a PCE. Specifically, RFC5441 proposes a Backward-Recursive PCE-Based Computation (BRPC) algorithm. This algorithm depends on communication between collaborative PCEs. A Path Computation Client (PCC) transmits, to PCEs within its respective domains, a path computation request PCReg message. The PCReg message is forwarded among PCEs of respective domains until the request reaches a PCE of a domain where a destination node taking charging of computation of a Label Switching Path (LSP) is located. The PCE in the destination domain establishes a Virtual Shortest Path Tree (VSPT) consisting of potential paths reaching the destination node, and transmits the path tree, via a path computation response PCRep message, to a preceding PCE. Then the VSPT is added to respective PCEs in sequence and transmitted backwards until reaching a PCE of a domain where a source node is located, the PCE selects, using the VSPT, an optimum end-to-end path and transmits the path to the PCC, as shown in FIG. 3. The method shown in FIG. 3 requires respective domains involving in the computation based on BRPC algorithm to support PCEs and requires all PCEs in respective domains to support an RFC5088 flooding automatic discovery function so that all the PCEs in respective domains are known to its neighbors. Certainly, the RFC5152 from the IETF further proposes a per-domain routing computation method with its basic principle similar to the RC method from OIF.

At present, in practical applications, there are three scenarios: 1) if respective domains in a domain sequence don't support PCEs, the RC computation method from OIF is adopted; 2) if respective domains in a domain sequence all support PCEs, the PCE BRPC computation method from IETF is adopted; and 3) if there are some domains supporting PCEs and some domains not supporting PCEs, an intercommunication computation is required to be performed.

As to the scenario 3), typical methods currently used include for example a method described in Chinese patent application published on Oct. 29, 2008 with the publication No. CN101296178A, i.e., a segmented computation method based on the per-domain routing computation and the BRPC respectively is adopted, it is determined by a boundary node of a preceding domain whether a next domain has PCEs, if yes, computation is performed according to a first path computation method (BRPC algorithm for PCEs); otherwise, computation is performed (as shown in an autonomous system 2 in FIG. 4) according to a second path computation method (per-domain routing computation algorithm). Finally, the routing is computed using the first path computation method or the second path computation method in sequence in respective domains, and lastly establishment of signaling is completed according to the computed routing. This method though partially solves the problem of intercommunication computation, there are still following defects: for a domain where the BRPC algorithm for PCEs is applied, it is still required that consecutive domains are all deployed PCEs, if there is a domain deployed without a PCE between two domains deployed with a PCE, the BRPC algorithm cannot be used, instead only the per-domain path computation method can be used, thus this may greatly lower the optimality of path computation and result in a poor efficiency of the path computation.

SUMMARY

In view of the above, the present disclosure is intended to provide a multi-domain routing computation method and device, a path computation element and a routing network, which can compute efficiently routing paths between different domains of multiple domains.

To this end, the technical solutions of the present disclosure are implemented as follows.

A multi-domain routing computation method, including:
when it is determined that there are two or more domains deployed with a Path Computation Elements (PCE) in a network, a routing path is computed, between a PCE of a first domain and a PCE of a last domain among the two or more domains deployed with a PCE, using an extended Backward-Recursive PCE-Based Computation (BRPC) algorithm, and the routing path is computed using a Routing Controller (RC) in domains other than the two or more domains deployed with a PCE.

In an embodiment, the step that a routing path is computed, between a PCE of a first domain and a PCE of a last domain among the two or more domains deployed with a PCE, using an extended BRPC algorithm may include:
after a PCE receives a trigger request for path computation, it is determined whether a domain where the PCE is located is the last domain, if it is the last domain, a Virtual Shortest Path Tree (VSPT) of said domain is computed; if it is a non-last domain, it is further determined whether there is a domain deployed without a PCE between said domain where the PCE is located and a next domain deployed with a PCE downstream of a sequence of domains, if there is not, the VPST of said domain is computed; if there is, an intra-domain abstract link of said domain deployed without a PCE and inter-domain link(s) between domains deployed without a PCE are taken as extended link topology, the extended link topology is combined with a link topology of said domain where the PCE is located, and the VSPT after the combination of link topology is computed.

In an embodiment, after the VSPT after the combination of link topology is computed, the method may further include:

a routing path corresponding to a VSPT computed through the extended link topology and a routing path corresponding to a VSPT computed through said domain where the PCE is located are indicated as different types of routing paths.

In an embodiment, the method may further include:

after the VSPT is computed, if it is determined that said domain where the PCE is located is a non-first domain of the two or more domains deployed with a PCE, the computed VSPT is transmitted to a next domain deployed with a PCE upstream of the sequence of domains.

In an embodiment, the step that a PCE receives a trigger request for path computation may include:

the PCE receives a path computation request message; or the PCE receives a VSPT.

In an embodiment, after the step that a routing path is computed, between a PCE of a first domain and a PCE of a last domain among the two or more domains deployed with a PCE, using an extended BRPC algorithm, the method may further include:

signaling is transmitted from a source node to a destination node;

when the signaling is routed to the routing path corresponding to a VSPT computed through said domain where the PCE is located, the signaling is routed according to the routing path corresponding to the VSPT; and when the signaling is routed to the routing path corresponding to a VSPT computed through the extended link topology, an intra-domain strict hop path corresponding to a loose hop path of the domain deployed without a PCE is further computed, and the signaling is routed according to a computed strict hop path.

A multi-domain routing computation device, including a determination unit and a computation unit, wherein the determination unit is configured to, when it is determined that there are two or more domains deployed with a PCE in a network, trigger the computation unit; and the computation unit is configured to compute a routing path, between a PCE of a first domain and a PCE of a last domain among the two or more domains deployed with a PCE, using an extended BRPC algorithm, and compute a routing path using a Routing Controller (RC) in domains other than the two or more domains deployed with a PCE.

In an embodiment, the computation unit may include a reception sub-unit, a first determination sub-unit, a second determination sub-unit, a first computation sub-unit and a second computation sub-unit, wherein the reception sub-unit is configured to receive a trigger request for routing computation;

the first determination sub-unit is configured to determine whether, a domain where a PCE to which the computation unit is attributed is located, is a last domain, trigger the first computation sub-unit when it is determined that said domain is the last domain, and trigger the second determination sub-unit when it is determined that said domain is a non-last domain;

the second determination sub-unit is configured to determine whether there is a domain deployed without a PCE between said domain where a PCE to which the computation unit is attributed is located and a next domain deployed with a PCE downstream of a sequence of domains, trigger the first computation sub-unit when it is determined that there is not, and trigger the second computation sub-unit when it is determined that there is;

the first computation sub-unit is configured to compute a VSPT of said domain where a PCE to which the computation unit is attributed is located; and the second computation sub-unit is configured to take, as extended link topology, an intra-domain abstract link of said domain deployed without a PCE and inter-domain link(s) between domains deployed without a PCE, combine the extended link topology with a link topology of said domain where a PCE to which the computation unit is attributed is located, and compute the VSPT of the link topology after the combination.

In an embodiment, the computation unit may further include an indication sub-unit configured to, after the second computation sub-unit computes the VSPT of the link topology after the combination, indicate, as different types of routing paths, a routing path corresponding to a VSPT computed through the extended link topology and a routing path corresponding to a VSPT computed through said domain where a PCE to which the computation unit is attributed is located.

In an embodiment, the computation unit may further include a third determination sub-unit and a transmission sub-unit, wherein the third determination sub-unit is configured to, after the VSPT is computed, when it is determined that said domain where the PCE is located is a non-first domain of the two or more domains deployed with a PCE, trigger the transmission sub-unit; and the transmission sub-unit is configured to transmit the computed VSPT to a next domain deployed with a PCE upstream of the sequence of domains.

In an embodiment, the reception sub-unit may be further configured to receive a path computation request message or receive the VSPT.

In an embodiment, the device may further include a transmission unit and a routing unit, wherein the transmission unit is configured to transmit signaling from a source node to a destination node; and the routing unit is configured to: when the signaling is routed to the routing path corresponding to a VSPT computed through said domain where the PCE is located, route the signaling according to the routing path corresponding to the VSPT; and when the signaling is routed to the routing path corresponding to a VSPT computed through the extended link topology, further computing, using the RC, an intra-domain strict hop path corresponding to a loose hop path of the domain deployed without a PCE, and route the signaling according to a computed strict hop path.

A Path Computation Element (PCE), comprising a reception unit, a first determination unit, a second determination unit, a first computation unit and a second computation unit, wherein the reception unit is configured to receive a trigger request for routing computation;

the first determination unit is configured to determine whether a domain where the PCE is located is a last domain, trigger the first computation unit when it is determined that said domain is the last domain, and trigger the second determination unit when it is determined that said domain is a non-last domain;

the second determination unit is configured to determine whether there is a domain deployed without a PCE between said domain where the PCE is located and a next domain deployed with a PCE downstream of a sequence of domains, trigger the first computation unit when it is determined that there is not, and trigger the second computation unit when it is determined that there is;

the first computation unit is configured to compute a Virtual Shortest Path Tree (VSPT) of said domain where the PCE is located; and the second computation unit is configured to take, as extended link topology, an intra-domain abstract link of said domain deployed without a PCE and inter-domain link(s) between domains deployed without a PCE, combine the extended link topology with a link topology of said domain where the PCE is located, and compute the VSPT of the link topology after the combination.

In an embodiment, the PCE may further include an indication unit configured to, after the second computation unit computes the VSPT of the link topology after the combination, indicate, as different types of routing paths, a routing path corresponding to a VSPT computed through the extended link topology and a routing path corresponding to a VSPT computed through said domain where the PCE is located.

In an embodiment, the PCE may further include a third determination unit and a transmission unit, wherein the third determination unit is configured to, after the VSPT is computed, when it is determined that said domain where the PCE is located is a non-first domain of the two or more domains deployed with a PCE, trigger the transmission unit; and the transmission unit is configured to transmit the computed VSPT to a next domain deployed with a PCE upstream of the sequence of domains.

In an embodiment, the reception unit may be further configured to receive a path computation request message or receive the VSPT.

A routing network including more than one routing domain provided with the aforementioned path computation unit.

In the present disclosure, when it is determined that there are two or more domains deployed with a PCE in a network, a routing path is computed, between a PCE of a first domain and a PCE of a last domain among the two or more domains deployed with a PCE, using a Backward-Recursive PCE-Based Computation (BRPC) algorithm, and a routing path is computed using a Domain to Domain Routing Protocol (DDRP) in domains other than the two or more domains deployed with a PCE. The computing the routing path using a BRPC algorithm specifically includes: after a PCE receives a trigger request for path computation, it is determined whether a domain where the PCE is located is the last domain, if it is the last domain, a Virtual Shortest Path Tree (VSPT) of said domain is computed; if it is a non-last domain, it is further determined whether there is a domain deployed without a PCE between said domain where the PCE is located and a next domain deployed with a PCE downstream of a sequence of domains, if there is not, computing the VPST of said domain; if there is, an intra-domain abstract link of said domain deployed without a PCE and inter-domain link(s) between domains deployed without a PCE are taken as extended link topology, the extended link topology is combined with a link topology of said domain where the PCE is located, and the VSPT after the combination of link topology is computed. According to the technical solutions of the present disclosure, in a hybrid networking case where there are domains deployed with a PCE and domains deployed without a PCE, domain topology of the domains deployed without a PCE is taken as extended topology of inter-domain links during computation by an existing BRPC algorithm, and during BRPC of respective PCEs, the topology is used to generate a virtual shortest path tree for respective domains, thereby solving the problem that the BRPC algorithm cannot be implemented due to existence of domains deployed without a PCE and improving the optimality of paths.

DETAILED DESCRIPTION

Figure 1:
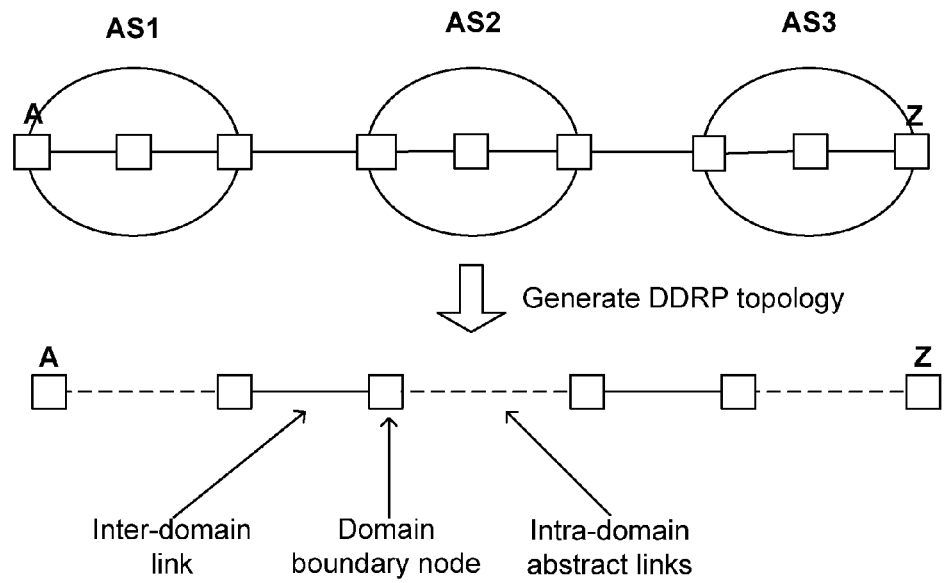
FIG. 1 is a schematic diagram showing generation of DDRP topology using an RC.
Figure 2:
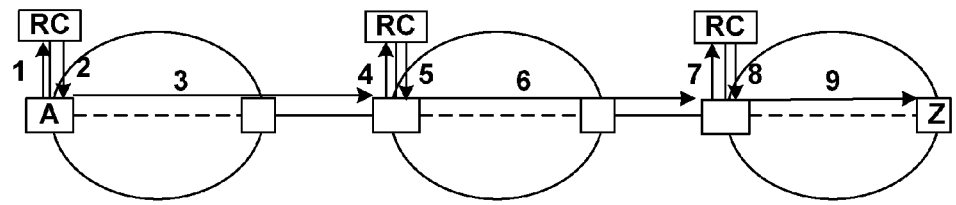
FIG. 2 is a schematic diagram showing multi-domain path computation using an RC.
Figure 3:
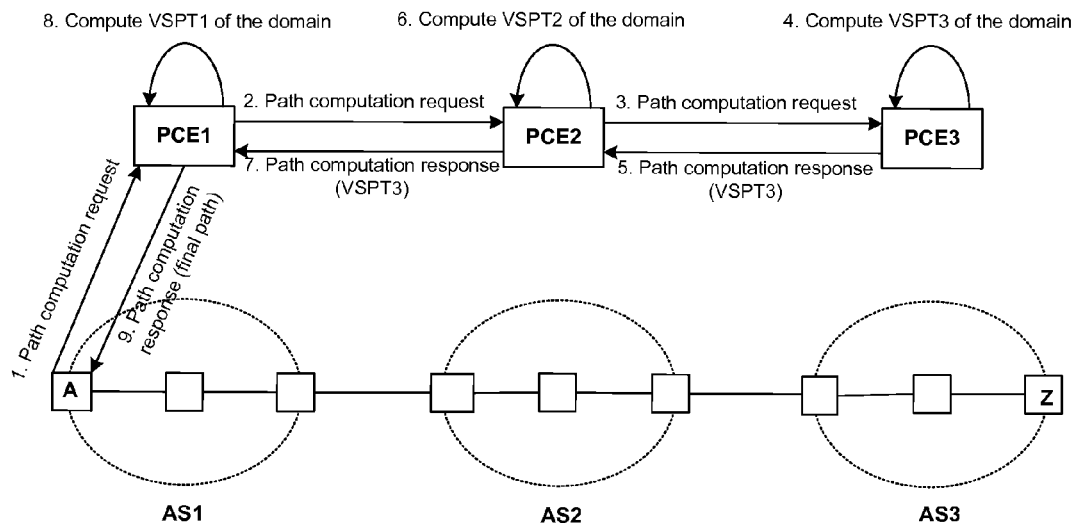
FIG. 3 is a schematic diagram showing multi-domain path computation using a PCE.
Figure 4:
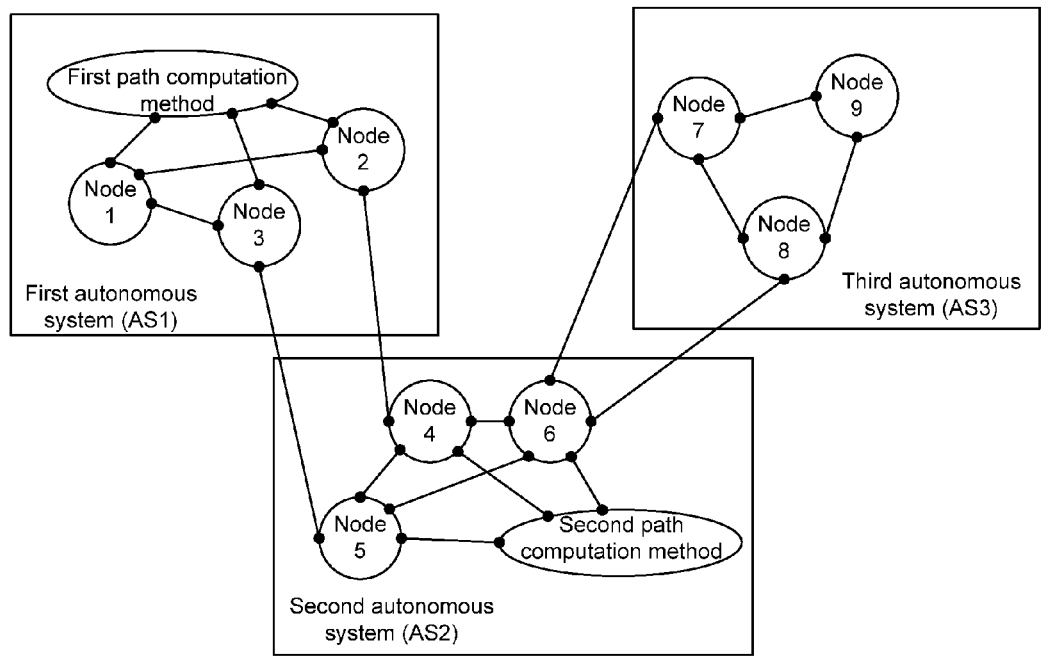
FIG. 4 is a schematic diagram showing multi-domain routing intercommunication computation.

In order to make objectives, technical solutions and advantages of the present disclosure more clear, the present disclosure will be further elaborated below in combination with the accompanying drawings and embodiments.

According to the present disclosure, in a hybrid networking case where there are domains deployed with a PCE and domains deployed without a PCE, an existing BRPC algorithm is extended, domain topology of the domains deployed without a PCE is taken as extended topology of inter-domain links during computation by the existing BRPC algorithm, and during BRPC of respective PCEs, the topology is used to generate a virtual shortest path tree for respective domains. Firstly, before implementation of cross-domain path computation, for domains deployed without a PCE, a DDRP of an RC is used to flood topology of respective domains, which includes information regarding inter-domain links, intra-domain abstract links, and domain boundary nodes. For domains deployed with a PCE, its PCE neighboring information needs to be configured, or automatically found information of the PCE flooded according to requirements of RFC5088 needs to be used so that the PCE neighboring information is acquired automatically. However, after the start of implementation of cross-domain path computation, before signaling arrives at a domain deployed with a PCE, the per domain path computation method is used to compute the path until the signaling arrives at the domain deployed with a PCE, then the PCE of this domain is taken as a PCE of a first domain for BRPC algorithm, a path computation request is transmitted in sequence along a sequence of domains, and the transmission ends until the path computation request arrives at a last domain deployed with a PCE in the sequence of domains, and the PCE of the last domain is taken as a PCE of a last domain for BRPC algorithm. Path computation is performed using a BRPC algorithm between the PCE of the first domain and the PCE of the last domain, domain topology of domains deployed without a PCE is taken as an extended topology of an inter-domain link, which is used by during BRPC by a PCE of a upstream domain that is most adjacent to the domain. When the whole BRPC process is completed, path segments in domains deployed with a PCE are represented as strict hop paths, and path segments in domains deployed without a PCE are represented as loose hop paths. Finally, signaling is established along routing computed according to BRPC, for strict hop paths, signaling is established directly. For loose hop paths, specific path computation of intra-domain paths is completed and the signaling is established in respective domains. When there is a domain deployed without a PCE after the last domain deployed without a PCE in the sequence of domains, then the per domain path computation algorithm is continued to be used to compute routing until a destination node is arrived, then the multi-domain intercommunication computation ends.

The present disclosure extends application scenarios of the BRPC algorithm so that the BRPC algorithm can be used in a sequence of domains where at least two domains deployed with a PCE are needed, and there is no limitation to relative positions of these two domains deployed with a PCE in the sequence of domains. Of course, the more the two domains deployed with a PCE are adjacent to two ends, the more apparently the advantages of the method according to the present disclosure are. Furthermore, in cases where domains deployed with a PCE and domains deployed without a PCE are arranged at intervals, the computation can be completed by using only one BRPC computation process according to the technical solutions of the present disclosure.

The technical solutions according to the present disclosure have no limitations to designation and computation of the sequence of domains, domains deployed with a PCE and domains deployed without a PCE can be arranged in any way. Furthermore, for flooding of inter-domain topology for domains deployed without a PCE and finding of a neighboring PCE are both prior arts, thus they does not need to be extended according to the method of the present disclosure.

Figure 5A:
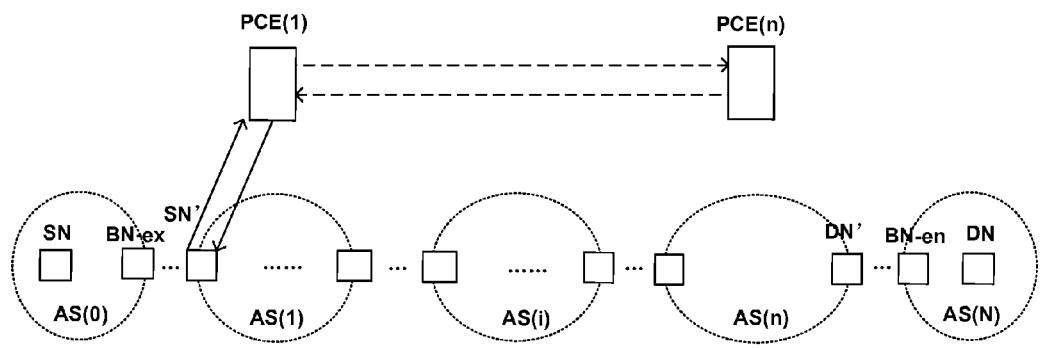
FIG. 5 is a schematic diagram showing multi-domain routing computation according to the present disclosure.

As shown in FIG. 5(a), assuming that it is desired to compute multi-domain routing from an SN (source node) to a DN (destination node), and there are domains therebetween deployed with a PCE and domains deployed without a PCE. A computation process using the method according to the present disclosure will be described as follows.

In the present disclosure, the following agreement is made:

1) AS(0), AS(N) represent respectively, for multi-domain routing intercommunication computation, a domain where a source node is located and a domain where a destination node is located;

2) AS(1), AS(n) represent respectively, in a sequence of multi-domain routing domains, a first domain deployed with a PCE and a last domain deployed with a PCE;

3) AS(i) represents, in a sequence of multi-domain routing domains, a domain deployed without a PCE;

4) AS(i−1) represents a domain most adjacent to domain AS(i), which is upstream of the latter and deployed with a PCE;

5) AS(i+1) represents a domain most adjacent to domain AS(i), which is downstream of the latter and deployed with a PCE;

6) PCE(1), PCE(n), PCE(i−1), PCE(i+1) represent respectively PCEs corresponding to AS(1), AS(n), AS(i−1), AS(i+1);

7) SN, DN represent respectively a source node in AS(0) and a destination node in AS(N);

8) SN', DN' represent respectively an ingress boundary node where signaling of AS(1) arrives and an egress boundary node where signaling of AS(n) leaves;

9) BN-en, BN-ex represent respectively an entering boundary node and an exiting boundary node;

10) A1, A2, A3, A4, B1, B2, B3, B4, C1, C2 represent respectively boundary nodes of AS(i−1), AS(i), AS(i+1).

The above agreement is used to facilitate description of the present disclosure and not intended to limit the networking way of the present disclosure. Since the method according to the present disclosure does not relate to determination of a sequence of domains, the method according to the present disclosure is based on a given sequence of domains (a sequence of domains passed by, for example AS1->AS2->AS3).

A process for the multi-domain routing intercommunication computation according to the present disclosure is described as follows.

Step 1, inter-domain topology information of respective domains is announced using a DDRP for example as shown in FIG. 1, and the information includes domain boundary nodes, inter-domain links and intra-domain abstract links.

Step 2, PCEs of domains deployed with a PCE find automatically the information by flooding respective PCEs to acquire neighboring relation between PCEs. For domains deployed without a PCE, flooding PCEs to acquire information will not be performed. Whether a domain is deployed with or without a PCE is determined by searching for a PCE therein through an SN or BN-en to automatically find the information.

Step 3, as shown in FIG. 5(a), starting from AS(0) along a sequence of domains, it is determined in sequence by the SN or BN-en whether a domain is a domain deployed with a PCE:

1) if it is not a domain deployed with a PCE and AS(N) is not arrived, routing of the domain is computed by a per-domain routing computation method (from a BN-en to BN-ex of the domain), and a BN-en of a next domain is selected by the BN-ex of the domain. Then signaling is routed to the BN-en, and step 3 is repeated;

2) if it is a domain deployed with a PCE, step 4 is implemented;

3) if it is not a domain deployed with a PCE and AS(N) has been arrived, routing of the domain is computed by a per-domain routing computation method (from a BN-en of the domain to a DN), and the signaling is routed to the DN, and then step 8 is performed;

Step 4, PCE(1) takes AS(1) as a first domain for BRPC, searches out, according to neighboring relation of PCEs, AS(n), i.e., a final domain deployed with a PCE in a sequence of domains, and takes it as a last domain for BRPC. AS(1) takes, an entering boundary node where the signaling arrives the domain, as a source node for BRPC routing computation, and selects, according to the DDRP, an egress boundary node of AS(n) as a destination node for the BRPC routing computation. PCE(1) transmits a BRPC routing computation request message along a PCE sequence to PCE(n), as shown in FIG. 5(a);

Step 5, during the BRPC processing process, for i=n to i=1, AS(i) performs following processes:

1) if i=n, PCE(n) of AS(n) computes a VSPT(n) of the domain according to a general last domain BRPC method, and bears the VSPT(n) in a routing computation response message so as to transmit it to a PCE of an upstream domain, step 5 is implemented repeatedly;

2) if 1<i<n, for each AS(i), below process is made according to method A and method B depending on whether AS(i) is deployed with a PCE:

Method A (with a PCE deployed)

A-1: PCE(i) of AS(i) computes a VSPT(i) of the domain according to a general last domain BRPC method, and inserts the VSPT(n) in a routing computation response message so that PCE(i) transmits it to a PCE of an upstream domain, step 5 is implemented repeatedly;

Method B (without a PCE deployed)

Figure 5B:
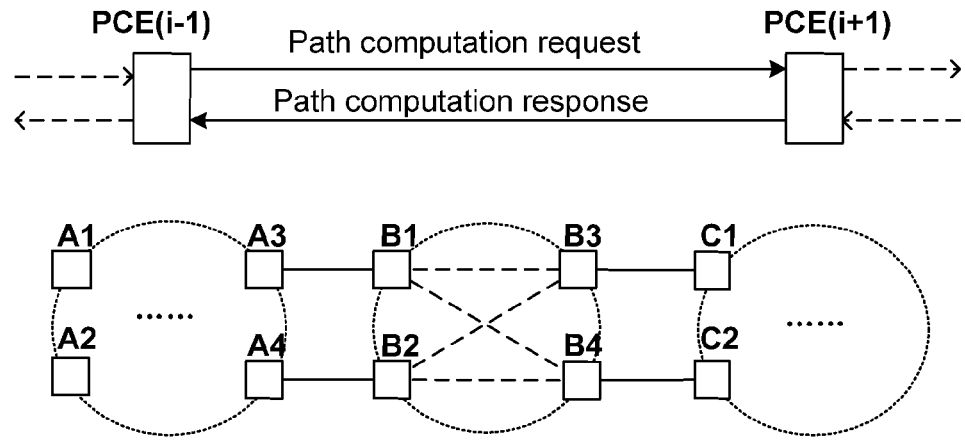
Figure 5C:
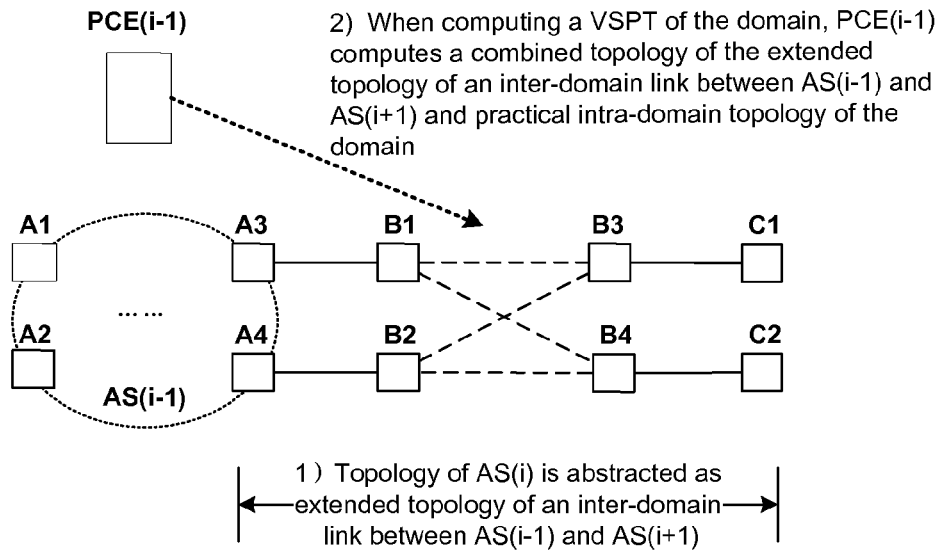

B-1: as shown in FIG. 5(b), PCE(i+1) transmits VSPT(i+1) to PCE(i-1) through the routing computation response message. According to the BRPC algorithm, PCE(i-1) needs to computes VSPTs from A1 and A2 to a destination node DN. The domain topology of AS(i) includes inter-domain links (A3-B1, A4-B2, B3-C1, B4-C2) and intra-domain abstract links (B1-B3, B1-B4, B2-B3, B2-B4);

B-2: as shown in FIG. 5(c), PCE(i-1) takes the domain topology of AS(i) as extended topology of a inter-domain link from exiting boundary nodes (A3/A4) of the domain (AS(i-1)) to entering boundary nodes C1/C2 of a downstream domain (AS(i+1)), and combines the extended topology with practical topology within AS(i-1) (i.e., A1/A2 to A3/4) as topology used in BRPC for the domain;

B-3: as shown in FIG. 5(c), PCE(i-1) computes a shortest path from A1/A2 to C1/C2 and stitches it with VSPT(i+1) of a downstream domain so as to compute VSPT(i-1) of the domain, especially, the path of VSPT(i-1) in AS(i) is represented in a loose hop path way while the path in AS(i-1) is represented in a strict hop path way. PCE(i-1) bears VSPT(i-1) in the routing computation response message so that PCE(i-1) transmits it to a PCE of an upstream domain, step 5 is implemented repeatedly;

3) if i=1, PCE(1) of AS(1) computes a VSPT(1) of the domain according to a general first domain BRPC method, and generates a shortest path from SN' to DN', then proceed to step 6;

step 6, the signaling is routed from SN' along a computed path from SN' to DN'. Further, for paths represented in a strict hop path way, routing is performed directly; for paths represented in a loose hop path way, an intra-domain computation process is initiated between two loose hop paths in the domain, with its computation process being consistent with the computation process in a general single domain, and then proceed to step 7;

step 7, the signaling arrives at DN', and routing of all subsequent domains is computed according to a general per-domain path computation method since they are deployed without a PCE, the signaling is routed until it arrives at DN, then proceed to step 8; and step 8, the multi-domain routing intercommunication computation ends.

Embodiment 1

The application scenario of this example includes: the first domain and the last domain being domains deployed with a PCE and intermediate domains being domains deployed without a PCE.

Figure 6:
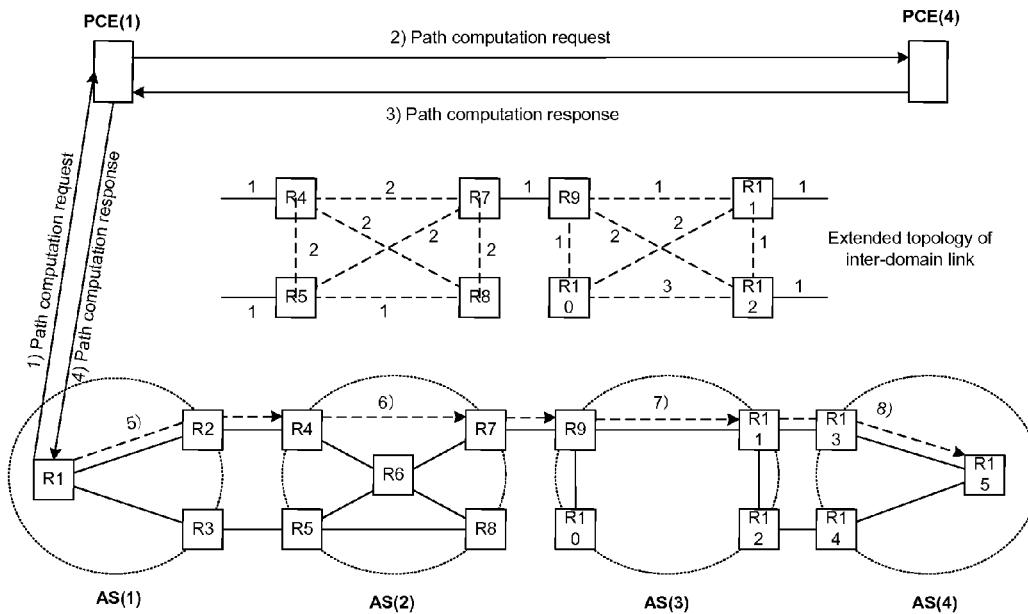
FIG. 6 is a schematic diagram showing multi-domain routing computation according to a first embodiment of the present disclosure.

As shown in FIG. 6, four ASs are shown (AS(1), AS(2), AS(3), AS(4)), in which AS(1) and AS(4) are deployed with a PCE (PCE(1) and PCE(4), respectively) while AS(2) and AS(3) are deployed without a PCE. R1 and R15 are respectively a source node and a destination node for multi-domain path computation. All the link costs in the topology are 1. Inter-domain topology of respective domains has been flooded through the DDRP, and the automatically found information of PCEs is also flooded out according to requirements of RFC5088. PCE(1) and PCE(4) can see the inter-domain topology, and establishes neighboring relation between the PCEs. The multi-domain routing computation process is as follows.

(1) A path computation request message is transmitted from R1 to PCE(1), which requires PCE(1) to compute a multi-domain path from R1 to R15;

(2) PCE(1) determines, according to the sequence of domains and the PCE neighboring relation of the automatically found information of the PCEs, that the last PCE in the sequence of domains is PCE(4) and the corresponding domain is AS(4), and forwards the path computation request message to PCE(4);

(3) PCE(4) computes a VSPT of its domain, which is designated as VSPT(4), and bears VSPT(4) in a path computation response message and returns it to PCE(1);

(4) after receiving VSPT(4) from PCE(4), PCE(1) takes, an inter-domain link between AS(2) and AS(3) and intra-domain abstract links (represented by dashed lines) of the inter-domain topology, as inter-domain link extended topology between PCE(1) and PCE(4), then PCE(1) combines its intra-domain topology with the inter-domain link extended topology, computes optimal paths from R1 to R13 and from R1 to R14, and stitches them with the path in VSPT(4) to form VSPT(1), namely an end-to-end path which is represented as ERO (Explicit Routing Object): R1-R2-R4-R7-R9-R11-R13-R15;

(5) the signaling is routed to R4 along the ERO=R4-R7-R9-R11-R13-R15;

(6) R4-R7 are loose hop paths, an intra-domain path from R4 to R7 is computed at R4, which gives R4-R6-R7, and the extended ERO is R4-R6-R7-R9-R11-R13-R15, then the signaling is routed to R9 along the ERO=R9-R11-R13-R15;

(7) R9-R11 is a loose hop path, an intra-domain path from R9 to R11 is computed at R9, which gives R9-R11, and the extended ERO is R9-R11-R13-R15, then the signaling is routed to R11 along the ERO=R11-R13-R15; and (8) R11-R13-R15 are all strict hop paths, the signaling is routed in sequence and arrives at R15, and then the computation process of multi-domain paths from R1 to R15 ends.

Embodiment 2

The application scenario of this example includes: intermediate domains being domains deployed with a PCE and the first domain and the last domain being domains deployed without a PCE.

Figure 7:
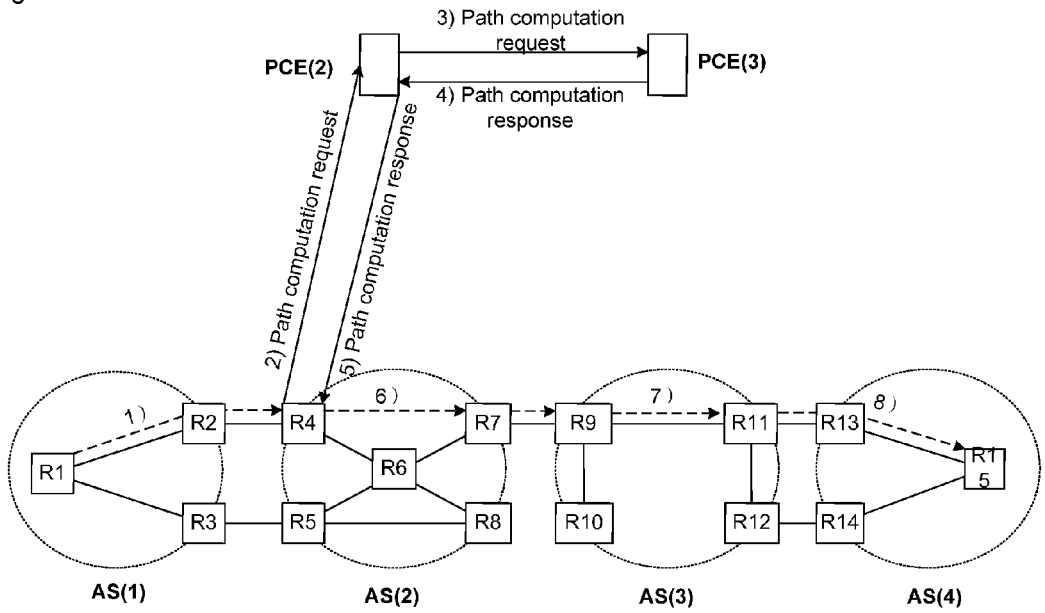
FIG. 7 is a schematic diagram showing multi-domain routing computation according to a second embodiment of the present disclosure.

As shown in FIG. 7, four ASs are shown (AS(1), AS(2), AS(3), AS(4)), in which AS(2) and AS(3) are deployed with a PCE (PCE(2) and PCE(3), respectively) while AS(1) and AS(4) are deployed without a PCE. R1 and R15 are respectively a source node and a destination node for multi-domain path computation. All the link costs in the topology are 1. Inter-domain topology of respective domains has been flooded through the DDRP, and the automatically found information of PCEs is also flooded out according to requirements of RFC5088. PCE(2) and PCE(3) can see the inter-domain topology, and establishes neighboring relation between the PCEs. The multi-domain routing computation process is as follows.

(1) R1 finds its domain is deployed without a PCE, and computes using a per domain routing computation method to acquire, a path from R1 to R2, which is R1-R2, and routes the signaling to R2, then an ingress boundary node of a next domain is selected by R2 as R4, and the signaling arrives at the entering boundary node R4 of AS(2) along the routing.

(2) R4 of AS(2) finds that its domain is deployed with a PCE, then it initiates a BRPC request message to PCE(2);

(3) PCE(2) determines, according to the sequence of domains and the PCE neighboring relation of the automatically found information of the PCEs, that the last PCE in the sequence of domains is PCE(3) and the corresponding domain is AS(3). PCE(2) takes R4 as a source node for BRPC, selects an egress boundary node R11 of RCE(3) as a destination node for BRPC, and forwards the path computation request message to PCE(3);

(4) PCE(3) computes a VSPT of its domain, which is designated as VSPT(3), and bears VSPT(3) in a path computation response message and returns it to PCE(2);

(5) PCE(2) returns a path computation response message to node R3 along ERO=R4-R6-R7- -R9-R11, in which all paths are a strict hop paths;

(6) the signaling is routed to R11 along strict hop paths of the ERO, and an ingress node of a next domain is selected by R11 as R13;

(7) R13 of AS(4) finds that its domain is deployed without a PCE, then computes routing of the domain using a per domain path computation method, selects a path of R13-R15 and routes the signaling to R15, then the multi-domain computation process ends.

Embodiment 3

The application scenario of this example includes: domains deployed with a PCE and without a PCE being arranged at intervals.

Figure 8:
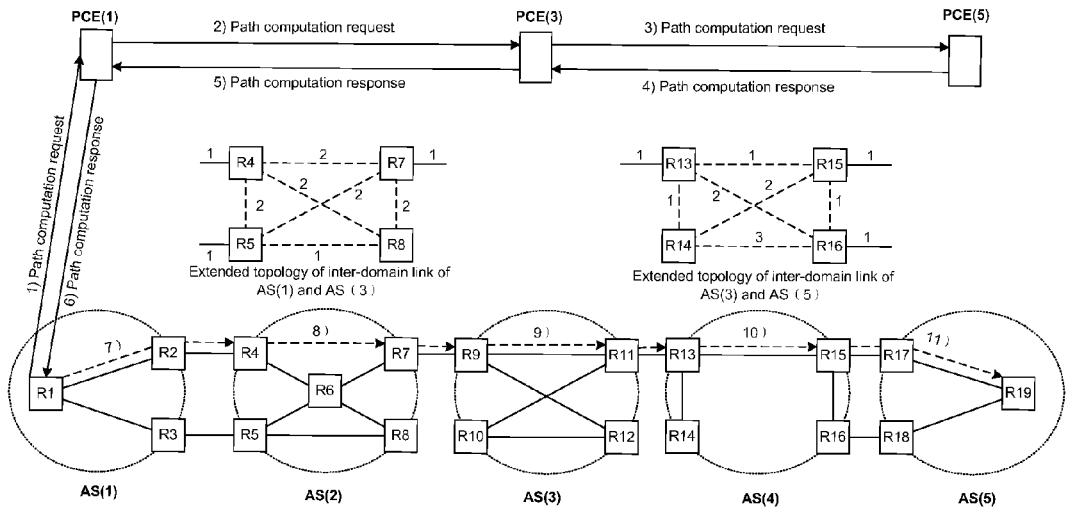
FIG. 8 is a schematic diagram showing multi-domain routing computation according to a third embodiment of the present disclosure.

As shown in FIG. 8, five ASs are shown (AS(1), AS(2), AS(3), AS(4), AS(5)), in which AS(1), AS(3) and AS(5) are deployed with a PCE (PCE(1), PCE(3) and PCE(5), respectively) while AS(2) and AS(4) are deployed without a PCE. R1 and R19 are respectively a source node and a destination node for multi-domain path computation. All the link costs in the topology are 1. Inter-domain topology of respective domains has been flooded through the DDRP, and the automatically found information of PCEs is also flooded out according to requirements of RFC5088. PCE(1), PCE(3) and PCE(5) can see the inter-domain topology, and neighboring relation is established between the PCEs. The multi-domain routing computation process is as follows.

(1) R1 finds that its domain is deployed with a PCE, and requests PCE(1) of its domain for multi-domain path computation.

(2) PCE(1) determines, according to the sequence of domains and the PCE neighboring relation of the automatically found information of the PCEs, that the last PCE in the sequence of domains is PCE(5) and the corresponding domain is AS(5). PCE(1) takes R41 as a source node for BRPC, and takes R19 as a destination node for BRPC, and forwards the path computation request message to a PCE of a downstream domain;

(3) the PCE(3) receives the path computation request message, and continues to forwards it to PCE(5);

(4) PCE(5) determines that R19 is a node of its domain, computes VSPT(5) (ERO1: R17-R19, ERO2: R18-R19) of its domain, and returns it to PCE(3) through a path computation response message;

(5) after receiving VSPT(5) from PCE(5), PCE(3) takes, an inter-domain link of AS(4) and intra-domain abstract links (represented by dashed lines) of the inter-domain topology, as inter-domain link extended topology between PCE(3) and PCE(5), then PCE(3) combines its intra-domain topology with the inter-domain link extended topology, computes optimal paths from R9/R10 to R17/R18, and stitches them with the path in VSPT(5) to form VSPT(3), which is represented as ERO (Explicit Routing Object): R9-R11-R13-R15-R17-R19 和 R10-R11-R13-R15-R17-R19, and returns the ERO to PCE(1) through the path computation response message;

(6) after receiving VSPT(3) from PCE(3), PCE(1) takes, an inter-domain link of AS(2) and intra-domain abstract links (represented by dashed lines) of the inter-domain topology, as inter-domain link extended topology between PCE(1) and PCE(3), then PCE(1) combines its intra-domain topology with the inter-domain link extended topology, computes optimal paths from R1 to R9/R10, and stitches them with the path in VSPT(3) to form VSPT(1), which is namely an end-to-end path and represented as ERO (Explicit Routing Object): R1-R2-R4-R7-R9-R11-R13-R15-R17-R19, and returns the ERO to R1 through the path computation response message;

(7) after receiving the path computation response message, R1 routes it to R4 along the ERO path, which is R4-R7-R9-R11-R13-R15-R17-R19;

(8) R4 finds that R4-R7 are loose hop paths, initiates an intra-domain computation process to obtain a path R4-R6-R7, and routes the signaling to R7 with the ERO being R7-R9-R11-R13-R15-R17-R19;

(9) R7 routes the signaling to R13 along a strict hop path with ERO being R13-R15-R17-R19;

(10) R13 finds that R13-R15 are loose hop paths, initiates an intra-domain computation process to obtain a path R13-R15, and routes the signaling to R17 with the ERO being R17-R19;

(11) R17 routes the signaling to R19 according to the strict hop path, then the multi-domain path computation process ends.

There are various combinations of domains deployed with a PCE with domains deployed without a PCE during the multi-domain routing intercommunication computation.

Figure 9:
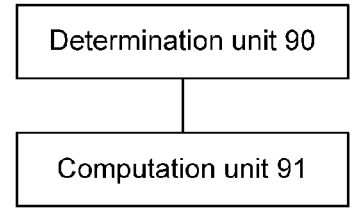
FIG. 9 is a schematic structural diagram of a multi-domain routing computation device according to an embodiment of the present disclosure.

FIG. 9 is a schematic structural diagram of a multi-domain routing computation device according to an embodiment of the present disclosure, as shown in FIG. 9, the multi-domain routing computation device according to the embodiment of the present disclosure includes a determination unit 90 and a computation unit 91, wherein the determination unit 90 is configured to, when it is determined that there are two or more domains deployed with a PCE in a network, trigger the computation unit; and the computation unit 91 is configured to compute a routing path, between a PCE of a first domain and a PCE of a last domain among the two or more domains deployed with a PCE, using a BRPC algorithm, and compute a routing path using a Domain to Domain Routing Protocol (DDRP) in domains other than the two or more domains deployed with a PCE.

Figure 10:
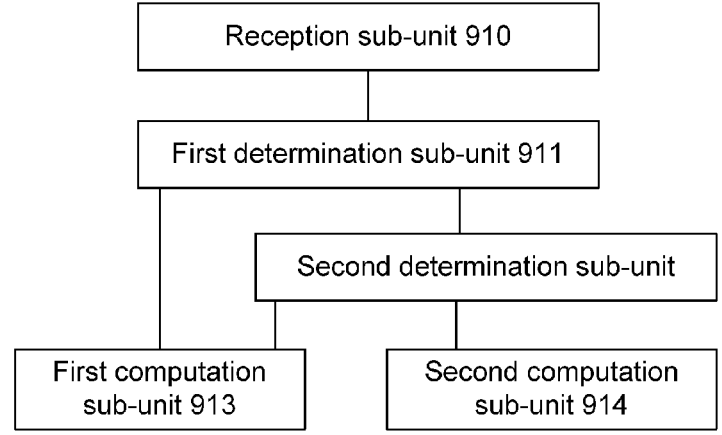
FIG. 10 is a schematic structural diagram of a computation element of the multi-domain routing computation device according to an embodiment of the present disclosure.

FIG. 10 is a schematic structural diagram of a computation unit 91 of a multi-domain routing computation device according to an embodiment of the present disclosure, as shown in FIG. 10, the computation unit 91 according to the embodiment of the present disclosure includes a reception sub-unit 910, a first determination sub-unit 911, a second determination sub-unit 912, a first computation sub-unit 913 and a second computation sub-unit 914, wherein the reception sub-unit 910 is configured to receive a trigger request for routing computation;

the first determination sub-unit 911 is configured to determine whether, a domain where a PCE to which the computation unit 91 is attributed is located, is a last domain, trigger the first computation sub-unit 913 when it is determined that said domain is the last domain, and trigger the second determination sub-unit 912 when it is determined that said domain is a non-last domain;

the second determination sub-unit 912 is configured to determine whether there is a domain deployed without a PCE between said domain where a PCE to which the computation unit 91 is attributed is located and a next domain deployed with a PCE downstream of a sequence of domains, trigger the first computation sub-unit 913 when it is determined that there is not, and trigger the second computation sub-unit when it is determined that there is;

the first computation sub-unit 913 is configured to compute a Virtual Shortest Path Tree (VSPT) of said domain where a PCE to which the computation unit 91 is attributed is located; and the second computation sub-unit 914 is configured to take, as extended link topology, an intra-domain abstract link of said domain deployed without a PCE and inter-domain link(s) between domains deployed without a PCE, combine the extended link topology with a link topology of said domain where a PCE to which the computation unit 91 is attributed is located, and compute the VSPT of the link topology after the combination.

On the basis of the computation unit 91 as shown in FIG. 10, the computation unit 91 may further include an indication sub-unit (not shown in FIG. 10) configured to, after the second computation sub-unit 914 computes the VSPT of the link topology after the combination, indicate, as different types of routing paths, a routing path corresponding to a VSPT computed through the extended link topology and a routing path corresponding to a VSPT computed through said domain where a PCE to which the computation unit 91 is attributed is located.

On the basis of the computation unit 91 as shown in FIG. 10, the computation unit 91 may further include a third determination sub-unit (not shown in FIG. 10) and a transmission sub-unit (not shown in FIG. 10), wherein the third determination sub-unit is configured to, after the VSPT is computed, when it is determined that said domain where the PCE is located is a non-first domain of the two or more domains deployed with a PCE, trigger the transmission sub-unit; and the transmission sub-unit is configured to transmit the computed VSPT to a next domain deployed with a PCE upstream of the sequence of domains.

The reception unit 910 is further configured to receive a path computation request message or receive the VSPT.

On the basis of the multi-domain routing computation device as shown in FIG. 9, the multi-domain routing computation device according to the embodiment may further include a transmission unit (not shown in FIG. 9) and a routing unit (not shown in FIG. 9), wherein the transmission unit is configured to transmit signaling from a source node to a destination node; and the routing unit is configured to: when the signaling is routed to the routing path corresponding to a VSPT computed through said domain where the PCE is located, route the signaling according to the routing path corresponding to the VSPT; and when the signaling is routed to the routing path corresponding to a VSPT computed through the extended link topology, further compute an intra-domain strict hop path corresponding to a loose hop path of the domain deployed without a PCE, and route the signaling according to a computed strict hop path.

It should be appreciated by those skilled in the art that functions implemented by respective processing units and processing sub-units of the multi-domain routing computation device shown in FIG. 9 can be understood with reference to the above related description of the multi-domain routing computation method. It should be appreciated by those skilled in the art that functions of respective processing units and processing sub-units of the multi-domain routing computation device shown in FIG. 9 can be implemented by running programs on a processor or by specific logic circuits.

Figure 11:
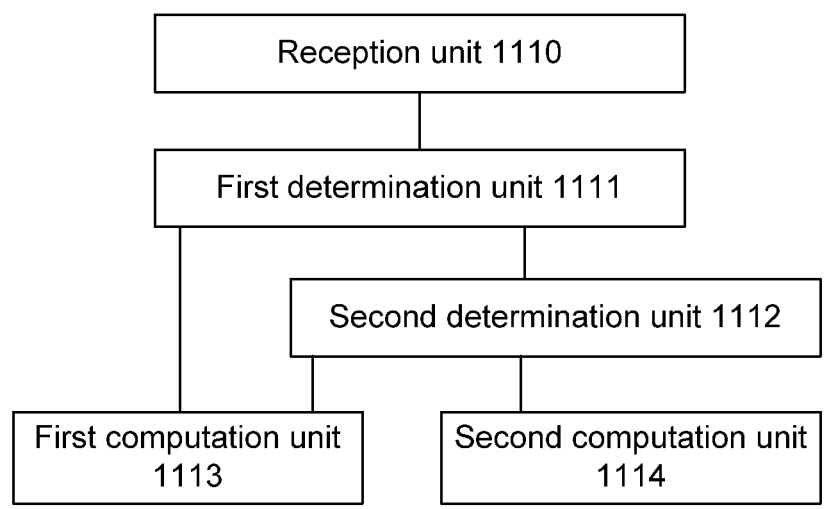
FIG. 11 is a schematic structural diagram of a path computation unit according to an embodiment of the present disclosure.

FIG. 11 is a schematic structural diagram of a PCE according to an embodiment of the present disclosure, as shown in FIG. 11, the PCE according to the embodiment of the present disclosure includes a reception unit 1110, a first determination unit 1111, a second determination unit 1112, a first computation unit 1113 and a second computation unit 1114, wherein the reception unit 1110 is configured to receive a trigger request for routing computation;

the first determination sub-unit 1111 is configured to determine whether a domain where the PCE is located is a last domain, trigger the first computation unit 1113 when it is determined that said domain is the last domain, and trigger the second determination unit 1112 when it is determined that said domain is a non-last domain;

the second determination unit 1112 is configured to determine whether there is a domain deployed without a PCE between said domain where the PCE is located and a next domain deployed with a PCE downstream of a sequence of domains, trigger the first computation unit 1113 when it is determined that there is not, and trigger the second computation unit when it is determined that there is;

the first computation unit 1113 is configured to compute a Virtual Shortest Path Tree (VSPT) of said domain where the PCE is located; and the second computation unit 1114 is configured to take, as extended link topology, an intra-domain abstract link of said domain deployed without a PCE and inter-domain link(s) between domains deployed without a PCE, combine the extended link topology with a link topology of said domain where the PCE is located, and compute the VSPT of the link topology after the combination.

On the basis of the PCE as shown in FIG. 11, the PCE according to the embodiment may further include an indication sub-unit (not shown in FIG. 11) configured to, after the second computation unit 1114 computes the VSPT of the link topology after the combination, indicate, as different types of routing paths, a routing path corresponding to a VSPT computed through the extended link topology and a routing path corresponding to a VSPT computed through said domain where the PCE is located.

On the basis of the PCE as shown in FIG. 11, the PCE according to the embodiment may further include a third determination unit (not shown in FIG. 11) and a transmission unit (not shown in FIG. 11), wherein the third determination unit is configured to, after the VSPT is computed, when it is determined that said domain where the PCE is located is a non-first domain of the two or more domains deployed with a PCE, trigger the transmission unit; and the transmission unit is configured to transmit the computed VSPT to a next domain deployed with a PCE upstream of the sequence of domains.

The reception unit 1110 is further configured to receive a path computation request message or receive the VSPT.

It should be appreciated by those skilled in the art that functions implemented by respective processing units of the path computation element shown in FIG. 11 can be understood with reference to the above related description of the multi-domain routing computation method. It should be appreciated by those skilled in the art that functions of respective processing units of the path computation element shown in FIG. 11 can be implemented by running programs on a processor or by specific logic circuits.

The present disclosure further discloses a routing network including more than one routing domain provided with the aforementioned path computation unit.

Apparently, it should be appreciated by those skilled in the art that processing units and steps of the present disclosure above can be implemented by a general-purpose computing device, and they may be integrated into an individual computing device or distributed on a network consisting of multiple computing devices; optionally, they can be implemented by program codes executable by a computing device so that they can be stored in a storage device so as to be implemented by a computing device, or they can be implemented by being made as respective IC modules or by some modules or steps therein being made as individual IC modules. In this way, the present disclosure are not limited to any specific combinations of a hardware and a software.

What described are merely preferable embodiments of the present disclosure, and are not intended to limit the present disclosure.

INDUSTRIAL APPLICABILITY

According to the technical solutions of the present disclosure, in a hybrid networking case where there are domains deployed with a PCE and domains deployed without a PCE, domain topology of the domains deployed without a PCE is taken as extended topology of inter-domain links during computation by an existing BRPC algorithm, and during BRPC of respective PCEs, the topology is used to generate a virtual shortest path tree for respective domains, thereby solving the problem that the BRPC algorithm cannot be implemented due to existence of domains deployed without a PCE and improving the optimality of paths.

The invention claimed is:

1. A multi-domain routing computation method, comprising:

when it is determined that there are two or more domains deployed with a Path Computation Elements (PCE) in a network, computing a routing path, between a PCE of a first domain and a PCE of a last domain among the two or more domains deployed with a PCE, using an extended Backward-Recursive PCE-Based Computation (BRPC) algorithm, and computing a routing path using a Routing Controller (RC) in domains other than the two or more domains deployed with a PCE;

wherein the computing a routing path, between a PCE of a first domain and a PCE of a last domain among the two or more domains deployed with a PCE, using an extended BRPC algorithm comprises:

after a PCE receives a trigger request for path computation, determining whether a domain where the PCE is located is the last domain, if it is the last domain, computing a Virtual Shortest Path Tree (VSPT) of said domain: if it is a non-last domain, further determining whether there is a domain deployed without a PCE between said domain where the PCE is located and a next domain deployed with a PCE downstream of a sequence of domains, if there is not, computing the VPST of said domain; if there is, taking, as extended link topology, an intra-domain abstract link of said domain deployed without a PCE and inter-domain link(s) between domains deployed without a PCE, combining the extended link topology with a link topology of said domain where the PCE is located, and computing the VSPT after the combination of link topology.

2. The method according to claim 1, after the computing the VSPT of the combined link topology, further comprising:

indicating, as different types of routing paths, a routing path corresponding to a VSPT computed through the extended link topology and a routing path corresponding to a VSPT computed through said domain where the PCE is located.

3. The method according to claim 2, after the computing a routing path, between a PCE of a first domain and a PCE of a last domain among the two or more domains deployed with a PCE, using an extended BRPC algorithm, further comprising:

transmitting signaling from a source node to a destination node;

when the signaling is routed to the routing path corresponding to a VSPT computed through said domain where the PCE is located, routing the signaling according to the routing path corresponding to the VSPT; and when the signaling is routed to the routing path corresponding to a VSPT computed through the extended link topology, further computing an intra-domain strict hop path corresponding to a loose hop path of the domain deployed without a PCE, and routing the signaling according to a computed strict hop path.

4. The method according to claim 1, further comprising:

after the VSPT is computed, if it is determined that said domain where the PCE is located is a non-first domain of the two or more domains deployed with a PCE, transmitting the computed VSPT to a next domain deployed with a PCE upstream of the sequence of domains.

5. The method according to claim 4, the process that a PCE receives a trigger request for path computation comprises:

receiving, by the PCE, a path computation request message;

or receiving, by the PCE, a VSPT.

6. A multi-domain routing computation device, comprising a determination unit and a computation unit, wherein the determination unit is configured to, when it is determined that there are two or more domains deployed with a Path Computation Element (PCE) in a network, trigger the computation unit; and the computation unit is configured to compute a routing path, between a PCE of a first domain and a PCE of a last domain among the two or more domains deployed with a PCE, using an extended Backward-Recursive PCE-Based Computation (BRPC) algorithm, and compute a routing path using a Routing Controller (RC) in domains other than the two or more domains deployed with a PCE;

wherein the computation unit comprises a reception sub-unit, a first determination sub-unit, a second determination sub-unit, a first computation sub-unit and a second computation sub-unit, wherein the reception sub-unit is configured to receive a trigger request for routing computation;

the first determination sub-unit is configured to determine whether, a domain where a PCE to which the computation unit is attributed is located, is a last domain, trigger the first computation sub-unit when it is determined that said domain is the last domain, and trigger the second determination sub-unit when it is determined that said domain is a non-last domain;

the second determination sub-unit is configured to determine whether there is a domain deployed without a PCE between said domain where a PCE to which the computation unit is attributed is located and a next domain deployed with a PCE downstream of a sequence of domains, trigger the first computation sub-unit when it is determined that there is not, and trigger the second computation sub-unit when it is determined that there is;

the first computation sub-unit is configured to compute a Virtual Shortest Path Tree (VSPT) of said domain where a PCE to which the computation unit is attributed is located; and the second computation sub-unit is configured to take, as extended link topology, an intra-domain abstract link of said domain deployed without a PCE and inter-domain link(s) between domains deployed without a PCE, combine the extended link topology with a link topology of said domain where a PCE to which the computation unit is attributed is located, and compute the VSPT of the link topology after the combination.

7. The device according to claim 6, wherein the computation unit further comprises an indication sub-unit configured to, after the second computation sub-unit computes the VSPT of the link topology after the combination, indicate, as different types of routing paths, a routing path corresponding to a VSPT computed through the extended link topology and a routing path corresponding to a VSPT computed through said domain where a PCE to which the computation unit is attributed is located.

8. The device according to claim 7, further comprising a transmission unit and a routing unit, wherein the transmission unit is configured to transmit signaling from a source node to a destination node; and the routing unit is configured to: when the signaling is routed to the routing path corresponding to a VSPT computed through said domain where the PCE is located, route the signaling according to the routing path corresponding to the VSPT; and when the signaling is routed to the routing path corresponding to a VSPT computed through the extended link topology, further computing, using the RC, an intra-domain strict hop path corresponding to a loose hop path of the domain deployed without a PCE, and route the signaling according to a computed strict hop path.

9. The device according to claim 6, wherein the computation unit further comprises a third determination sub-unit and a transmission sub-unit, wherein the third determination sub-unit is configured to, after the VSPT is computed, when it is determined that said domain where the PCE is located is a non-first domain of the two or more domains deployed with a PCE, trigger the transmission sub-unit; and the transmission sub-unit is configured to transmit the computed VSPT to a next domain deployed with a PCE upstream of the sequence of domains.

10. The device according to claim 9, wherein the reception sub-unit is further configured to receive a path computation request message or receive the VSPT.

11. A Path Computation Element (PCE), comprising a reception unit, a first determination unit, a second determination unit, a first computation unit and a second computation unit, wherein the reception unit is configured to receive a trigger request for routing computation;

the first determination unit is configured to determine whether a domain where the PCE is located is a last domain, trigger the first computation unit when it is determined that said domain is the last domain, and trigger the second determination unit when it is determined that said domain is a non-last domain;

the second determination unit is configured to determine whether there is a domain deployed without a PCE between said domain where the PCE is located and a next domain deployed with a PCE downstream of a sequence of domains, trigger the first computation unit when it is determined that there is not, and trigger the second computation unit when it is determined that there is;

the first computation unit is configured to compute a Virtual Shortest Path Tree (VSPT) of said domain where the PCE is located; and the second computation unit is configured to take, as extended link topology, an intra-domain abstract link of said domain deployed without a PCE and inter-domain link(s) between domains deployed without a PCE, combine the extended link topology with a link topology of said domain where the PCE is located, and compute the VSPT of the link topology after the combination.

12. The PCE according to claim 11, further comprising an indication unit configured to, after the second computation unit computes the VSPT of the link topology after the combination, indicate, as different types of routing paths, a routing path corresponding to a VSPT computed through the extended link topology and a routing path corresponding to a VSPT computed through said domain where the PCE is located.

13. The PCE according to claim 12, further comprising a third determination sub-unit and a transmission sub-unit, wherein the third determination unit is configured to, after the VSPT is computed, when it is determined that said domain where the PCE is located is a non-first domain of the two or more domains deployed with a PCE, trigger the transmission unit; and the transmission unit is configured to transmit the computed VSPT to a next domain deployed with a PCE upstream of the sequence of domains.

14. A routing network comprising more than one routing domain provided with the PCE according to claim 12.

15. The PCE according to claim 13, wherein the reception unit is further configured to receive a path computation request message or receive the VSPT.

16. A routing network comprising more than one routing domain provided with the PCE according to claim 13.

17. A routing network comprising more than one routing domain provided with the PCE according to claim 15.

18. A routing network comprising more than one routing domain provided with the PCE according to claim 11.

* * * * *